United States Patent [19]

Smyth

[11] 4,351,360
[45] Sep. 28, 1982

[54] FLUID TIMER

[75] Inventor: Donald N. Smyth, South Plympton, Australia

[73] Assignee: Sabco Limited, Albert Park, Australia

[21] Appl. No.: 214,007

[22] Filed: Dec. 8, 1980

[51] Int. Cl.³ ............................................. F16K 31/48
[52] U.S. Cl. ............................ 137/624.12; 137/624.22
[58] Field of Search .................... 137/624.11, 624.12, 137/624.22, 624.21; 74/3.5, 3.54, 3.56

[56] References Cited

U.S. PATENT DOCUMENTS 2,772,067 11/1956 Wilson .................. 137/624.11 X
3,473,695 10/1969 Avesi .................... 137/624.11 X
4,270,574 6/1981 Graber .................... 137/624.11

Primary Examiner—Alan Cohan
Attorney, Agent, or Firm—Oldham, Oldham, Hudak & Weber Co.

[57] ABSTRACT

A fluid timer to control the flow of water, the timer having a clock work control which controls the closing of a valve through which the water flows through the timer.

4 Claims, 2 Drawing Figures

FLUID TIMER

This invention relates to fluid timers, and more particularly to timers which can be utilised for switching off the flow of fluid after a certain period of time, such as in watering and irrigation systems.

BACKGROUND OF THE INVENTION

Various forms of water regulation and timing devices are known, and many of these operate on the principle of bleeding off a portion of the flow of water to give an indication of the quantity of water that has passed through the unit, this bleed operating a valve mechanism to stop the flow of water when the desired quantity of water has passed through the unit. These units however are rather complicated in construction, and also require a relatively high degree of tolerance in their manufacture which causes the units to be relatively expensive.

Also due to the various impurities in water, problems to the bleed orifice and other operating parts can occur, and thus the units are not always satisfactory in operation.

It is an object of this invention to provide a fluid timer which is satisfactory in operation and yet it is simple and economical to produce.

BRIEF DESCRIPTION OF THE INVENTION

Thus there is provided according to the invention a fluid timer, comprising a fluid valve which is adapted to be opened by a driving device, preferably a clockwork timer and which is closed under the influence of a spring.

BRIEF DESCRIPTION OF THE DRAWINGS

In order to more fully describe the invention reference will now be made to the accompanying drawings in which.

DESCRIPTION OF THE PREFERRED EMBODIMENT

Figure 2:
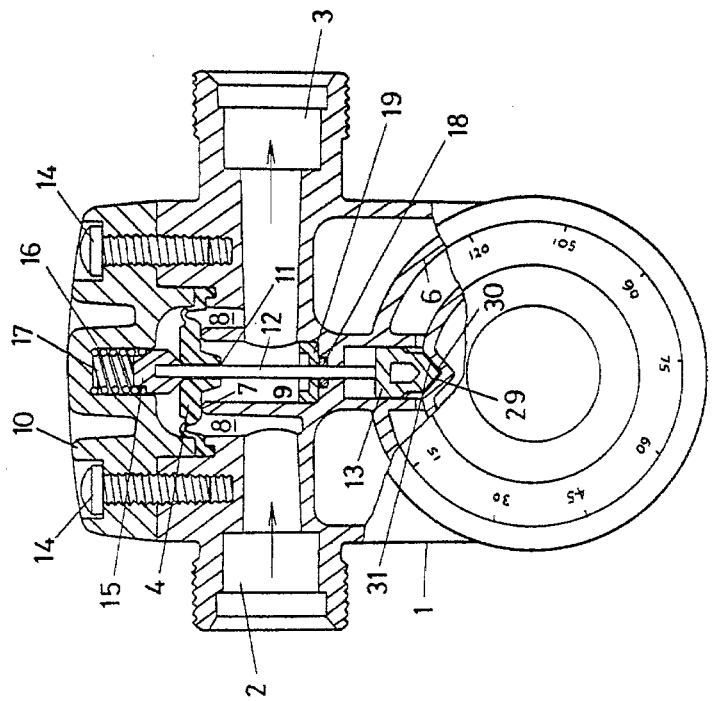
FIG. 2 is a cross section on the lines 2—2 of FIG. 1.
Figure 1:
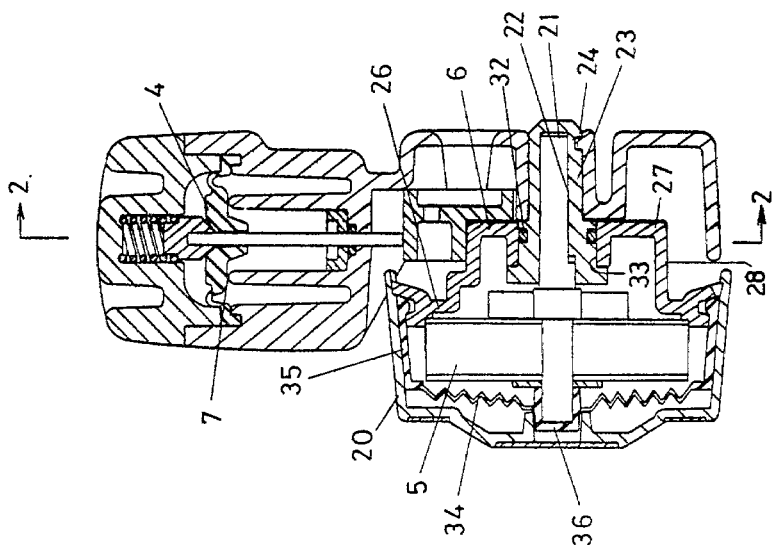
FIG. 1 is a cross section on the lines 1—1 of FIG. 2

In a preferred form of the invention there is provided a unit with a body 1 having an inlet passage 2 and an outlet passage 3, the connection between the inlet passage and outlet passage being controlled by a diaphragm valve 4.

The body 1 also has a provision for a clockwork timer 5 to be releasably attached to the body 1, the timer 5 having a cam-like member 6 to actuate the opening of the valve 4.

The inlet and outlet connections can be situated on opposite sides of the body, with the body being provided with a circular valve seat 7 adapted to co-operate with a diaphragm valve 4, the inlet passage 2 opening to passage 8 around the outside of the seat 7, so that when the diaphragm valve 4 is raised and not in contact with the seat 7 the fluid flows over the seat and into the interior chamber 9 connected to the outlet passage 3.

The diaphragm valve 4 is held in position by a removable end cap 10, this cap sealing the diaphragm valve 4 around its periphery to the body 1, the diaphragm valve 4 having an aperture 11, therethrough, through which a push rod 12 passes to engage a cam follower 13. The cap 10 is secured by screws 14.

The upper end of the push rod 12 is provided with an enlargement or an abutment 15, this co-operating with a spring 16 mounted in a recess 17 in the end cap 10, so that the abutment slides in the recess 17.

It will be seen that the spring 16 thus biases the diaphragm valve 4 to its closed position by the abutment 15 engaging on the centre of the diaphragm valve 4 to deflect the diaphragm valve 4 downwardly to come into sealing engagement with the seat 7.

The cam follower 13 is sideably mounted in the body and is adapted to engage with the cam member 6 on the timer 5. An 'O' ring 18 held in position by retainer 19 seals about the push rod 3 to prevent water passing down the push rod.

The timer 5 can comprise any desired timer, such as a clockwork mechanism, the timer 5 being mounted in a knob cover 20 which is adapted to be rotated by the user to rotate the timer 5 relative to its shaft 2 which is anchored in and located in the body of the unit, preferably by the shaft 21 of the timer being provided with a flat portion 22 to engage with a co-operating flat portion in a hollow clockwork shaft 23. The body 1 having a detent 24 to engage in a recess 25 on the clockwork shaft 23, so that the shaft 23 is located in the body 1 and is clipped therein in such a manner such that it cannot rotate relative to the body 1.

The timer 5 is mounted in the knob cover 20 of the unit, with the knob comprising a housing portion 26 and a cover portion 27. The housing portion 26 is shaped on its interior to co-operate with portions of the timer 5 itself, so that when the housing 26 is rotated the timer 5 rotates relative to the shaft 21.

The housing portion 26 includes a boss 28 of circular configuration, this boss having a recess 29 formed therein, the boss 28 thus forming the cam-like member 6 of the unit.

The cam follower 13 is adapted to engage the cam 6 and when the recess 29 is located opposite the follower 13, the spring 16 on the abutment 15 of the push rod 12 forces the push rod 12, cam follower 13 and thus the valve 4 in the direction to close the valve.

The cam follower 13 and recess 29 are shaped to have inclined surfaces 30, 31, so that when the timer 5 is moving the cam 6 to the closed position, the movement of the cam follower into the recess is not a sudden movement, but is a slow movement to close the valve slowly to prevent water hammer in the hoses and the pipes.

The shape of the surfaces 30, 31, also facilitates the turning of the housing to set the timer so that during this motion the cam follower is lifted to allow the valve to open.

The water pressure on the undersurface of the valve causes the valve to open by deflecting the diaphragm member away from its seat due to the fact that the abutment has been raised above the diaphragm member.

The clockwork shaft 23 of the timer is provided with a sealing member, preferably in the form of an 'O' ring 32, which seals in the aperture 33 in the housing portion 26, to prevent entry of water along the clockwork shaft 23 into the timing mechanism.

The knob cover 20 has suitable indicia thereon to indicate an off position and suitable timing marks up to for example a maximum of 120 minutes, these co-operating with suitable mark or indicia on the body so that the timing unit can be readily set.

In order to seal the knob cover 20, on the housing 26, and yet to allow sufficient ventilation for breathing inside the cap so that condensation does not occur within the cap or within the timing mechanism, there is provided a cup shaped soft flexible sheet or membrane 34 to extend over the timing mechanism and be sealed between the knob cover 20 and the housing portion 26, the suitable apertures being provided in the knob cover 20 so that when the cap and membrane are sealed to the housing, that any pressure variations which can occur within the knob cover 20 and housing portion 26 can be accommodated by flexing movement of the diaphragm which thus seals the timer mechanism from the atmosphere, and yet allows the interior of the cap to breathe to a desired degree. The membrane 34 has a thin concertina end position and circumferential wall 35 sealed between the knob cover 20 and the housing portion 26. It also includes a control cup shaped portion 36 mounted on the timer shaft to support the thin concertina portion.

If in use it is found that the timing mechanism does become defective, it is merely necessary to unclip the timing mechanism from the body, and replace this with a further timing mechanism, it being realised that these mechanisms themselves are relatively inexpensive.

Thus it will be seen there is provided a simple timing mechanism for use for turning off the flow of water to watering or irrigation systems, and it is to be realised that this fluid timer can be situated either adjacent the tap, or adjacent the sprinkler itself, or mounted on a hose reel or the like. Thus the fluid could be utilised for each sprinkler or group of sprinklers, or could be a master controller adjacent a tap or the like.

The claims defining the invention are as follows:

1. A fluid timer for controlling the flow of a fluid, said fluid timer having a body, an inlet passage connected to an annular valve seat, an outlet passage leading from the valve seat, a valve member adapted to seal on said seat under the influence of a spring, a timer mechanism, a cam member driven by said timer mechanism, and a push rod operated by said cam member to move said spring to allow said valve member to open by fluid pressure in the inlet characterized by said timer mechanism being mounted in and drivingly connected to a housing having an opening, and a cap closing said opening, said housing forming said cam chamber, and there being a sealing diaphragm sealed between said housing and cap and with said housing forming a sealed compartment for said timer mechanism.

2. A fluid timer as defined in claim 1 where said valve member is a flexible member anchored at its periphery, an abutment on said push rod engaged by said spring, said push rod passing through an aperture in said valve member and said abutment engaging said valve member to seal said valve member on said seat.

3. A fluid timer as defined in claim 1 or claim 2 wherein said cam member had a 'V' shaped recess, and said push rod has a correspondingly shaped 'V' shaped cam follower, whereby manual rotation of said timer and cam member causes said follower to rise out of said recess, and said co-operating shapes allows said follower to enter said recess in a manner to minimise sudden closing of said valve member.

4. A fluid timer as defined in claim 1, wherein at least a part of said diaphragm is flexible to accommodate for varying air pressure differences, air breather holes being provided through said cap whereby the diaphragm can flex while maintaining the sealed compartment.

* * * * *